A. A. SCHMIDT.
APPARATUS FOR ELECTRICAL TREATMENT OF GASES.
APPLICATION FILED OCT. 3, 1917.
1,309,221.
Patented July 8, 1919.
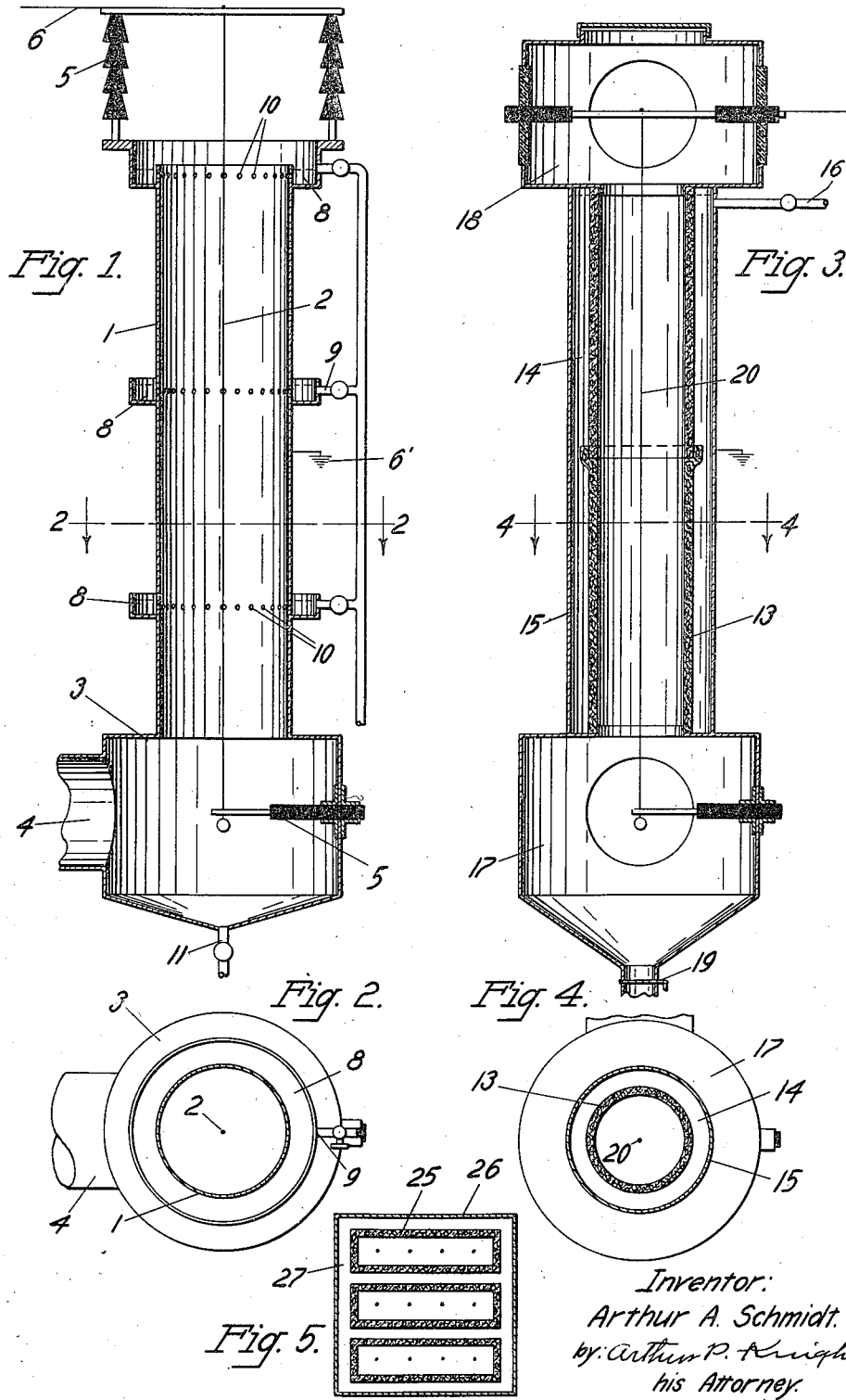
Inventor:
Arthur A. Schmidt.
by: Arthur P. Knight
his Attorney.

UNITED STATES PATENT OFFICE.

ARTHUR A. SCHMIDT, OF LOS ANGELES, CALIFORNIA, ASSIGNOR TO INTERNATIONAL PRECIPITATION COMPANY, OF LOS ANGELES, CALIFORNIA, A CORPORATION OF CALIFORNIA.

APPARATUS FOR ELECTRICAL TREATMENT OF GASES.

1,309,221.      Specification of Letters Patent.      Patented July 8, 1919.

Application filed October 3, 1917. Serial No. 194,615.

*To all whom it may concern:*

Be it known that I, ARTHUR A. SCHMIDT, a citizen of the United States, residing at Los Angeles, in the county of Los Angeles and State of California, have invented a new and useful Apparatus for Electrical Treatment of Gases, of which the following is a specification.

This invention relates particularly to an apparatus for separating suspended material from gases by electrical action, although it is also applicable, in some cases, to electrical treatment of gases for other purposes.

In the treatment of gases for removal of suspended material therefrom by electrical action, the gas is passed between electrodes which are so constructed and maintained at such potential difference as to cause the suspended material to be precipitated or collected, wholly or in part, on certain of the electrodes, which are called "collecting" or "receiving" electrodes. In the operation of such apparatus it is sometimes desirable to supply water or other liquid to the gases, or to the precipitated material, or to the surfaces of the collecting electrodes. Such addition of water or other liquid may be for the purpose of humidifying the gas so as to control the electrical or chemical actions taking place therein, or for the purpose of cooling the gas or the electrodes, or for the purpose of wetting or moistening the deposit on the electrodes, or for the purpose of washing away such deposit, or a portion thereof.

The main object of the present invention is to provide means for supplying water or other liquid for the above, or other purposes, in an apparatus of the kind, in such manner that the water or other liquid will be uniformly and effectively distributed on to the surfaces of the electrodes on which the suspended material is received or collected.

The accompanying drawings illustrate embodiments of my invention, and referring thereto:

Figure 1 is a vertical section of an electrical precipitator comprising a tubular electrode provided with water supply means according to my invention.

Fig. 2 is a section on line 2—2 in Fig. 1.

Fig. 3 is a vertical section of another form of the invention,

Fig. 4 is a section on line 4—4 in Fig. 3.

Fig. 5 is a horizontal section of another form of my invention.

The electrical precipitator shown in Figs. 1 and 2 comprises a tubular receiving electrode 1 and a discharge electrode 2 mounted therein. Casing 1 is shown as a vertical tube or pipe, connected at its lower end to a chamber or header 3, which receives the gas to be treated from an inlet flue 4. Any number of tubular receiving electrodes 1 may be mounted on said header 3, and said tubular electrode or electrodes may be open at their upper ends, as shown, or may be connected to an upper header for carrying away the treated gases. The construction shown is adapted to pass the gas upwardly through the treater, but if desired, the tubular electrode or electrodes 1 may be connected to suitable gas conduits in such manner as to cause the gas to pass downwardly through the precipitator.

The discharge electrode 2, consisting, for example, of a fine wire, may be mounted on suitable insulating supports 5 and may be connected by wire 6 to suitable means for applying high tension current thereto—for example, as shown in patent to F. G. Cottrell, No. 895,729, August 11, 1908, the receiving electrode 1 being preferably grounded as indicated at 6', and the source of high tension current being connected to complete the circuit through a ground connection.

The tubular receiving electrode 1 is provided with supply means for liquid, consisting of annular troughs 8 surrounding the said electrode and having supply pipe connections 9 for water, solution, or other liquid, perforations 10 being provided in the wall of said tubular electrode to permit such liquid to flow from the troughs through the receiving electrode from the outside thereof to the inner surfaces of the said electrode. Said troughs 8 may be provided at different levels on said tubular electrode, as shown, so as to distribute the liquid more effectively. Lower header 3 may be provided with means, such as drain pipe 11, for drawing off collected material, together with liquid.

In the operation of the apparatus, the liquid, such as water or solution, supplied to the troughs 8, runs down on the inner surface of the tubular receiving electrode 1 in a continuous stream or film, and a high potential difference is maintained between the discharge electrode 2 and the tubular receiving electrode 1, in such manner as to subject the gas passing through said tubular receiving electrode to the action of an electrical field, and to cause the material to be suspended in the gas to be precipitated on the receiving electrode, or more properly, on the film or stream of liquid on such electrode. The stream of liquid is preferably of sufficient volume to continually carry away the material so precipitated and the resulting pulp which collects in the lower chamber 3, is drawn off through suitable means indicated at 11. Or, if desired, the liquid may be supplied in less quantity, and the deposit may be removed by other means, for example, by flushing out the tubular electrode from time to time, or by mechanical means, such as is well known in the art.

As shown in Figs. 3 and 4, the wall of the tubular electrode, indicated at 13, may be formed of porous material, such as unglazed terra cotta, or equivalent material of any kind, and water, solution or other liquid may be supplied from a chamber 14 surrounding said tubular electrode and formed between the latter and an outer casing 15, said chamber 14 having a supply pipe 16 for water or other liquid. Headers or inlet and outlet chambers 17 and 18 are provided at the top and bottom of the tubular electrode, the lower header being provided with discharge gate 19 for precipitated material, such material being either drained into said chamber from the electrode 13 or flushed thereinto when required. Suitably supported and insulated discharge electrode means 20 is also provided, extending axially in the tubular electrode 13, and connected to a source of current, as above described. The operation of this form of my invention is substantially the same as in the case of the form shown in Figs. 1 and 2, it being noted that the film of water or solution on the tubular electrode 13 furnishes the requisite conductance for the current, in case said electrode is made of poorly conducting material, such as terra cotta pipe.

Any desired number of the porous walled tubular receiving electrodes may be arranged within a single outer casing, so that a single chamber supplies liquid to all of said electrodes, and said electrodes may be of any suitable shape, for example, as shown at 25 in Fig. 5, they may be rectangular in cross section and may be inclosed within an outer casing 26, the space 27 within said casing and around and between said collecting electrodes 25 constituting the liquid supply chamber. The discharge electrodes may consist of wires or strips hung in rows within the respective electrodes 25 and supported and insulated in any suitable manner.

What I claim is:

1. In apparatus for precipitating suspended particles from gases by electrical action, a porous electrode, and water supply means for supplying water from the outside of said electrode through said porous electrode to the inner surface thereof.

2. In apparatus for electrical precipitation of suspended particles from gases, a discharge electrode, a collecting electrode opposite said discharge electrode and having perforations distributed at different parts thereof, and means for supplying water to such perforations so that such water is supplied through the electrode from the outside thereof to the inner surface thereof.

3. In an apparatus for electrical precipitation of suspended particles from gases, a discharge electrode, a tubular porous collecting electrode surrounding said discharge electrode, and a casing surrounding said collecting electrode and forming a water receiving chamber between said collecting electrode and said casing.

4. In an apparatus for electrical precipitation of suspended particles from gases, a plurality of tubular porous collecting electrodes, a casing surrounding such plurality of collecting electrodes and forming a water receiving chamber around said electrodes, and discharge electrodes extending within the respective collecting electrodes.

In testimony whereof I have hereunto subscribed my name this 25th day of September 1917.

ARTHUR A. SCHMIDT.